(12) United States Patent
Lapounov et al.

(10) Patent No.: US 8,074,166 B2
(45) Date of Patent: Dec. 6, 2011

(54) XSLT/XPATH FOCUS INFERENCE FOR OPTIMIZED XSLT IMPLEMENTATION

(75) Inventors: Anton V. Lapounov, Redmond, WA (US); Ralf Lammel, Redmond, WA (US); Sergey Dubinets, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1262 days.

(21) Appl. No.: 11/521,525

(22) Filed: Sep. 13, 2006

(65) Prior Publication Data
US 2007/0245330 A1      Oct. 18, 2007

Related U.S. Application Data

(60) Provisional application No. 60/789,555, filed on Apr. 4, 2006.

(51) Int. Cl.
*G06F 17/00* (2006.01)
(52) U.S. Cl. ........................ 715/234; 715/200
(58) Field of Classification Search .................. 715/200, 715/234–236
See application file for complete search history.

(56) References Cited

U.S. PATENT DOCUMENTS

| | | | |
|---|---|---|---|
| 7,284,194 B2 | 10/2007 | Gupta | |
| 7,392,468 B2 | 6/2008 | Igata et al. | |
| 7,509,574 B2 | 3/2009 | Kamiya | |
| 7,590,644 B2 * | 9/2009 | Matsakis et al. | 707/101 |
| 2002/0069192 A1 * | 6/2002 | Aegerter | 707/1 |
| 2004/0088691 A1 | 5/2004 | Hammes et al. | |
| 2004/0158822 A1 | 8/2004 | Sandham et al. | |
| 2004/0230890 A1 | 11/2004 | Fukuda et al. | |
| 2006/0041872 A1 | 2/2006 | Poznanovic et al. | |
| 2006/0242563 A1 * | 10/2006 | Liu et al. | 715/513 |
| 2007/0245325 A1 * | 10/2007 | Lapounov et al. | 717/140 |
| 2008/0120283 A1 * | 5/2008 | Liu et al. | 707/4 |
| 2009/0249317 A1 * | 10/2009 | Hui et al. | 717/148 |

OTHER PUBLICATIONS

Wadler Philip, A Formal Semantics of Patterns in XSLT, Mar. 29, 2000, pp. 1-15.*
Crivat et al., Introducing XslCompiledTransform, Nov. 16, 2005, Microsoft, pp. 1-20.*
Kay, M., "Email: [Compiled] code running slower than the interpreter," http://www.stylusstudio.com/xsllist/200011/post91050.html, 2000 2 pages.
Kay, M., "XSLT and XPath Optimization," *XML*, http://idealliance.org/papers/dx_xmle04/papers/02-03-02/02-03-02.html, 2004, 1-7.
Kay, M., "What kind of language is XSLT?" http://www-128.ibm.com/developerworks/xml/library/x-xslt/?dwzone=x, Original article from 2001, updated 2005, 10 pages.

(Continued)

*Primary Examiner* — Stephen Hong
*Assistant Examiner* — Manglesh Patel
(74) *Attorney, Agent, or Firm* — Woodcock Washburn LLP

(57) ABSTRACT

Techniques are provided for performing focus inference when compiling an Extensible Markup Language Transforms (XSLT) stylesheet into a compiled XSLT processor. In XPath/XSLT, expression evaluation occurs with respect to the dynamic context. In XPath, the part of the dynamic context, related to the context node-set, is called the "focus" of the expression. Conceptually, the focus would need to be systematically computed and propagated along the recursive execution of XSLT templates. This is costly. Focus inference enables the more efficient execution of XSLT programs since the inferred focus information can be used directly by a code generator in an XSLT compilation architecture.

17 Claims, 4 Drawing Sheets

OTHER PUBLICATIONS

Kay, M., "Saxon: Anatomy of an XSLT processor, What is current state of the art in XSLT optimization?" http://www-128.ibm.com/developerworks/library/x-xslt2/, Original article from 2001, updated 2005, 8 pages.

Punte, S., "Fast XSLT, XML.COM," http://www.xml.com/pub/a/2003/04/02/xsltc.html, 2003, 4 pages.

Tkachenko, O., "The Raise of XSLT Compilation," http://www.tkachenko.com/blog/archives/000550.html, 2005, 3 pages.

Borning et al., "A Type Declaration and Inference System for Smalltalk", Proceedings of the 9th ACM SIGPLAN-SIGACT symposium on Principles of programming languages, Annual Symposium on Principles of Programming Languages, Albuquerque, New Mexico, (No Month Available) 1982, 133-141.

Dong et al., "Static Analysis of XSLT Programs", Proceedings of the 15th Australasian Database Conference (ADC), Australian Computer Science Communications, Dunedin, New Zealand, Jan. 2004, 27, 151-160.

Hindley, R., "The principal type scheme of an object in combinatory logic", Transactions of the American Mathematical Society, 146, Dec. 1969, 29-60.

Hosoya et al., "XDuce: A Statically Typed XML Processing Language", ACM Transactions on Internet Technology (TOIT), 3(2), May 2003, 117-148.

Marlow, S. et al., "A Practical Subtyping System for Erlang", International Conference on Functional Programming, Proceedings of the second ACM SIGPLAN international conference on Functional programming, Amsterdam, The Netherlands, Jun. 1997, 136-149.

Milner, Robin, "A Theory of Type Polymorphism in Programming", Journal of Computer and System Sciences, Computer Science Department, University of Edinburgh, Edinburgh, Scotland, Apr. 19, 1978, 17(3), 348-375.

Møller et al. "Static Validation of XSL Transformations" ACM Transactions on Programming Languages and Systems (TOPLAS), 29(4), Aug. 2007, 1-45.

Tozawa, Akihiko, "Towards static type checking for XSLT", Proceedings of the 2001 ACM Symposium on Document engineering, Atlanta, Georgia, USA, Nov. 9-10, 2001, 18-27.

W3C "XSL Transformations (XSLT)", http://www.w3.org./TR/xslt#section-Result-Tree-Fragments, Version 1.0, W3C Recommendation, first accessed, Nov. 16, 1999, 1-59.

W3C, "XML Path Language (XPath)", http://www.w3.org/TR/xpath#section-Introduction, Version 1.0, W3C Recommendation, first accessed, Nov. 16, 1999, 1-31.

* cited by examiner

XSLT/XPATH FOCUS INFERENCE FOR OPTIMIZED XSLT IMPLEMENTATION

CROSS REFERENCE TO RELATED APPLICATIONS

This application claims priority to U.S. Provisional Application 60/789,555, filed Apr. 4, 2006. This application is related by subject matter to U.S. Provisional Application 60/789,554, filed Apr. 4, 2006, and any subsequent nonprovisional applications claiming priority thereto.

BACKGROUND

XSL Transformations (XSLT) is a standard way to describe how to transform the structure of a first Extensible Markup Language (XML) document into a markup language document with a different structure. Extensible Stylesheet Language (XSL), XML, and XSLT are recommendations of the World Wide Web Consortium (W3C). There may be any number of versions of such recommendations, as with other electronics industry standards, and any versions are contemplated when such recommendations and standards are referenced herein. Specific versions are noted when helpful to the explanation.

Straightforward implementations of declarative languages are prohibitively inefficient. Dozens of XSLT processors are on the market, and they explore many different, non-trivial optimizations that aim to provide adequate execution performance and memory footprint.

Present optimization opportunities include: XPath expression normalization, XPath expression special casing, simple type inference, special casing of queries with singleton results, document-order preserving implementations that minimize or eliminate the need for sorting, efficient run-time representations of the input tree, symbolic representation of the templates as highly resolved expressions trees, output streaming, lazy evaluation, common subexpression elimination, compilation to byte code, and Just-In-Timing (JITing).

This field is still in flux. A consolidated opinion does not exist regarding the question whether the effort for a full-blown compiler is worth it, given the challenges of setting up a compiler architecture for XSLT. However, it increasingly appears the limits of non-compiling implementations are somewhat exhausted, and although compiler implementation requires major efforts, it may be an important next step in obtaining further gains.

Performance of XSLT processors is an important characteristic for XML users. The field is highly competitive, with each product achieving improvements and gains on a year-to-year basis. Presently, XslCompiledTransform is arguably the fastest, standard-compliant implementation. It is included in .NET 2.0. XslCompiledTransform comprises an implementation of focus interference technology, a highly original and XSLT-tailored optimization. Development of focus inference required deep insight and a vital refinement of techniques for compiler optimizations so that XSLT is faithfully modeled.

SUMMARY

Systems, methods, and computer readable media are provided for performing focus inference when compiling an Extensible Markup Language Transforms (XSLT) stylesheet into a compiled XSLT processor. In XPath/XSLT, expression evaluation occurs with respect to the dynamic context. In XPath, the part of the dynamic context, related to the context node-set, is called the "focus" of the expression. We refer to *XML Path Language (XPath) 2.0 W3C Recommendation* 23 Jan. 2007, for a formal definition:

The first three components of the dynamic context (context item, context position, and context size) are called the focus of the expression. The focus enables the processor to keep track of which items are being processed by the expression.

Certain language constructs, notably the path expression E1/E2 and the filter expression E1, create a new focus for the evaluation of a sub-expression. In these constructs, E2 is evaluated once for each item in the sequence that results from evaluating E1. Each time E2 is evaluated, it is evaluated with a different focus. The focus for evaluating E2 is referred to below as the inner focus, while the focus for evaluating E1 is referred to as the outer focus. The inner focus exists only while E2 is being evaluated. When this evaluation is complete, evaluation of the containing expression continues with its original focus unchanged.

The focus refers to a sort of implicit parameters for XSLT programs while these parameters have a special semantics based on XSLT's XML document processing model. The overall issue is also relevant for XPath.

Focus comprises the following entities: Context Node, Context Position, and Context Size—length of the current node set.

Each expression (including sub-expressions) should be able to access its focus. Context Node is required in many operations, e.g., when using '.' or the function name( ); Context Position is accessible via the function position( ) and implicitly by numeric predicates; Context Size is accessible only via the function last( ).

Conceptually, the focus would need to be systematically computed and propagated along the recursive execution of XSLT templates. This is costly, as we will discuss below. One objective of focus inference is to determine when exactly focus needs to be computed and propagated in an XSLT program. Thereby, focus inference enables the more efficient execution of XSLT programs since the inferred focus information can be used directly by a code generator in an XSLT compilation architecture. The exploitation of focus inference need not be not limited to the use in a compilation architecture. For instance, one could also use this information in an interpreter, a JITer or other components that actually or symbolically execute XSLT programs.

Calculating Context Size is especially expensive—it requires either caching the entire node set for the context in memory or representing each node set in a form that allows calculation of Context Size at first demand, if any. The tradeoffs are prohibitive computational or memory expenses vs. complicated infrastructure complete with challenges for disposing of lazy chunks. Calculating Context Position is less expensive, but these expenses add up of course, if we assume that context positions are computed and needlessly passed basically everywhere. The benefit of Context Node elimination is relatively marginal, but it is obtained for free once we have the infrastructure for focus inference in place. Aiming at the fastest XSLT implementation, we must care to even consider marginal optimizations, in the hope that benefits add up to a non-marginal result.

When a template involves calls to the functions position( ) or last( ) at the top level, i.e. not in the context of any other node set such as one introduced by an xsl:for-each, it can use the focus of the caller template. We name such calls "naked position( )" and "naked last( )". Naked uses are not typical.

Therefore, it is beneficial to engage in a technique whose aim is to avoid the calculation and propagation of focus.

Other advantages and features of the invention are described below.

BRIEF DESCRIPTION OF THE DRAWINGS

The systems and methods for XSLT/XPath focus inference for optimized XSLT implementation in accordance with the present invention are further described with reference to the accompanying drawings in which.

DETAILED DESCRIPTION

Figure 1:
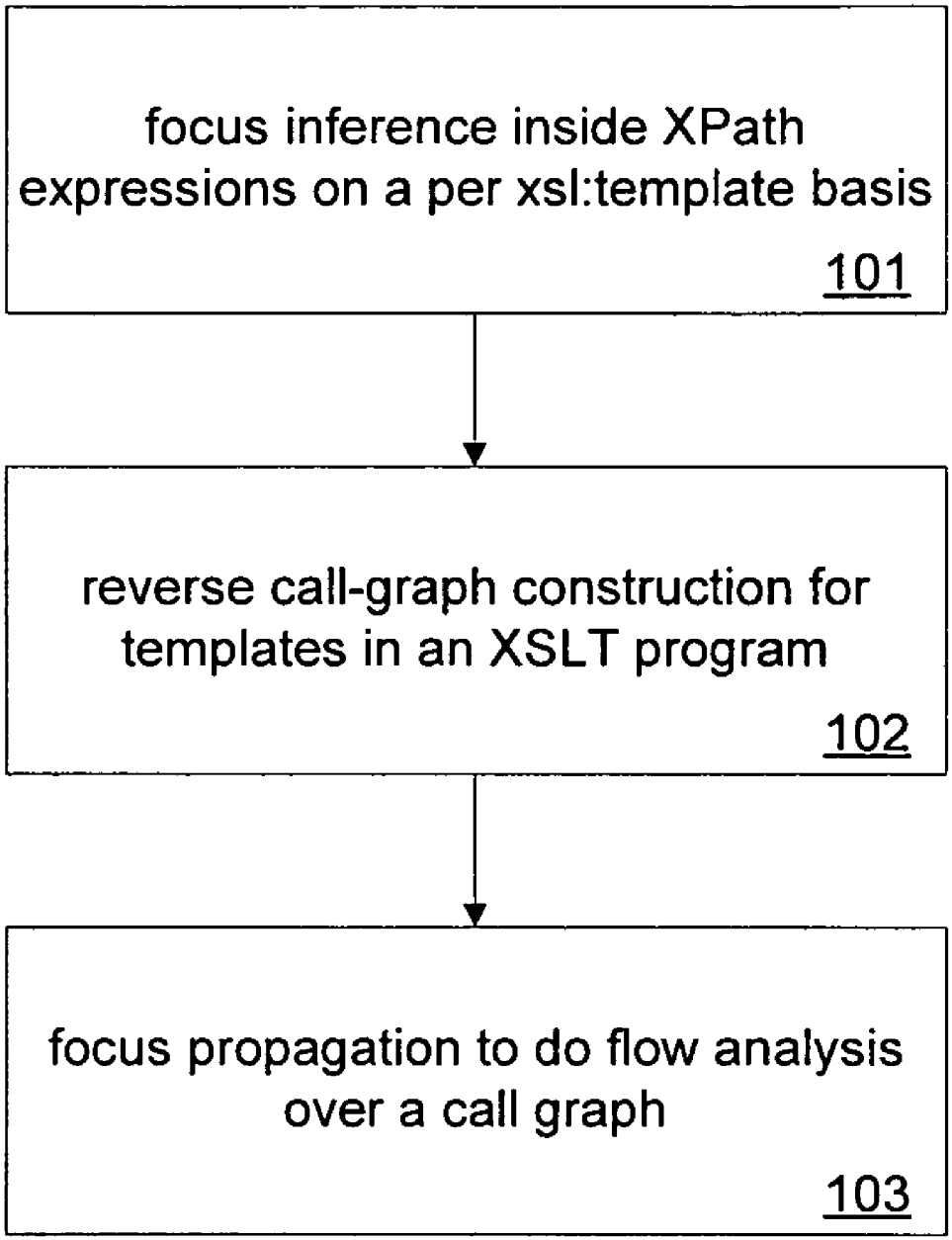
FIG. 1 broadly illustrates various phases of an exemplary program analysis for XSLT programs that may be conducted to achieve focus inference.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In one embodiment, contemplated systems and methods cam perform focus inference in a system with a call-graph, a data-flow graph, various flow analyses and an optimizing code generator. The performance of a technology such as XslCompiledTransform is achieved through a combination of techniques including optimizations as referenced in the background section, as well as: computation of a call graph, computation of a data-flow graph, side-effect inference, type inference, as described in U.S. Provisional Application 60/789,554, unused parameter elimination, dead-code elimination, and focus inference, as described herein.

Focus is more than just a parameter that is passed all through many levels of function application (i.e., template calls). Various forms of XSLT expressions define a new focus, e.g., select, for-each.

Because of this, in one embodiment, it would not be enough to make parameter positions for focus explicit; we would also need to anticipate "code" for computing focus. Given the pervasive propagation and re-definition of focus, this approach will lead to a blow-up of the overall "code" or AST representation of XSLT programs, which will hamper all sorts of program analyses on top of this more explicit representation.

The envisaged program analysis will be more challenging with regard to scalability. We recall that we are facing a so-called interprocedural (i.e., inter-template) analysis, which is known to easily get out of hand.

In one embodiment, the invention conducts a dedicated analysis for focus inference that is applied directly to the XSLT abstract representation which maintains the XSLT language constructs for calling and import templates. However, it is worth stressing that embodiments of the invention effectively refine the established technique for control-flow graphs and data-flow analysis. Our flow analysis need not deal with low-level def/use paths; it can rather deal with high-level "focus use".

Example of Focus Inference

Here is an XSLT template that uses last( ) and position( ) at the top level:

```
<xsl:template name="callee" match="*" >
    <xsl:value-of select="last( ) + position( )"/>
</xsl:template>
```

These uses of last( ) and position( ) are naked. Hence, it is clear that any "caller" template would need to pass focus, if it may end up calling "callee". A note on XSLT: we recall that the template name, "callee", is optional in some sense. That is, a caller may specifically select the relevant template indeed by using that name in xsl:call-template instruction, or the caller may use one of apply-templates instructions, and then any named and anonymous templates with the relevant "mode" and "match" attributes will be considered.

Consider the following template:

```
<xsl:template name="caller">
    <xsl:for-each select="foo">
        <xsl:call-template name="callee"/>
    </xsl:for-each>
    <xsl:apply-templates select="bar"/>
</xsl:template>
```

This template does the following:

It selects "foo"s for a for-each loop that calls the "callee" template per "foo".

It also applies (all) templates to the node set with "bar"s.

We can see that in one embodiment the template does neither use last( ) nor position( ), and therefore no naked calls. However, the program structure is such that not even any template call within "caller" could involve naked uses on the current node of the "caller" template. Instead, the given template calls templates on "new" nodes or node sets. So it turns out that we do not have to pass Context Size and Context Position to "caller". Since the template "callee" will be (potentially) applicable in both locations in "caller", we can pass the new focus with the calls.

In one embodiment, focus inference can comprise program analysis for XSLT programs that comprises the phases illustrated in FIG. 1, each of which is described in greater detail below. The phases illustrated in FIG. 1 are: Focus inference inside XPath expressions on a per xsl:template basis 101, Reverse call-graph construction for all templates in an XSLT program 102, and Focus propagation to do the flow analysis over the call graph 103.

While FIGS. 1-4 are presented as steps of exemplary methods, it should be understood that such steps may be implemented as components in a computing system and/or as instructions on computer readable medium.

Phase 1—Focus Inference Inside XPath Expressions

According to step 101 in FIG. 1, one embodiment may conduct a focus inference inside XPath expressions on a per xsl:template basis step 101. One implementation of such a step 101 is illustrated in FIG. 2.

Figure 2:
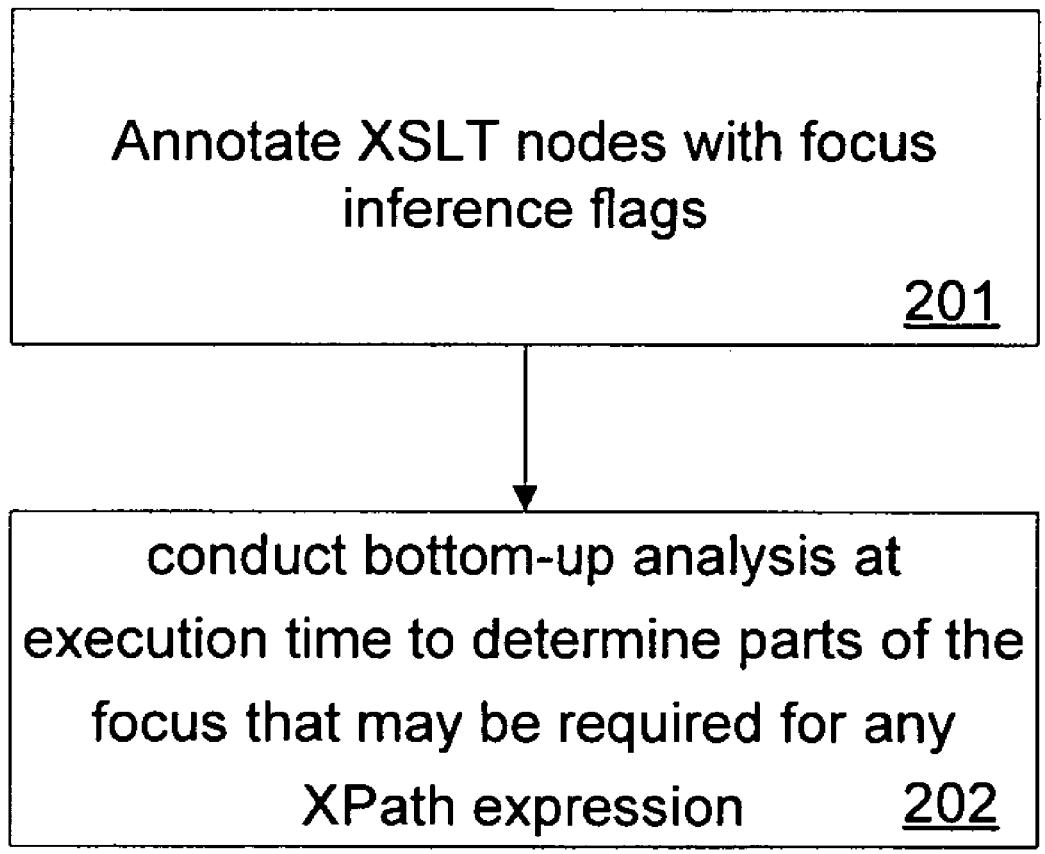
FIG. 2 illustrates an exemplary focus inference method to be carried out in accordance with an exemplary embodiment of the invention.

Referring to FIG. 2, in one embodiment, we annotate XSLT AST nodes with focus inference flags 201. In such an implementation, these flags carry the following names: XslFlags.Current, XslFlags.Position, XslFlags.Last. These flags record the status of AST nodes to require the relevant part of the focus. Simple bottom-up analysis allows us to determine the parts of the focus that may be required for any XPath expression at execution time 202.

Consider the following XSLT snippet:
<xsl:value-of select="foo[position( )=3]"/>
position( ) refers to Context Position in the node-set of "foo"s.

The expression "position( )=3" requires the Context Position of its parent expression. The Context Position must therefore be maintained along the query of "foo"s. We record this context dependency by annotating the "position( )=3" expression with the flag XslFlags.Position.

Here is another example dealing with XPath expressions in a context of a single template:

```
<xsl:for-each select="bar">
    <xsl:value-of select="last( )"/>
</xsl:for-each>
```

We face a nested expression with a for-each loop at the outer level and another select inside. We can observe that the inner select makes use of last( ); we can also observe that this use of last( ) refers to the Context Size that resulted from the outer query for the node set with "bar"s. Hence, phase 1 annotates the inner select with XslFlags.Last. All these annotations provide the seed set for the subsequent propagation.

We note that the use of position( ) and last( ) in the above two examples are indeed restricted to the local node set for "foo"s and "bar"s; the uses do not imply, by themselves, that Context Position or Context Size must be passed to the templates that host the shown XSLT constructs.

Phase 2—Reverse Call-Graph Construction

According to step 102 in FIG. 1, one embodiment may conduct a reverse call-graph construction for templates in an XSLT program step 102. One implementation of such a step 102 is illustrated in FIG. 3.

Figure 3:
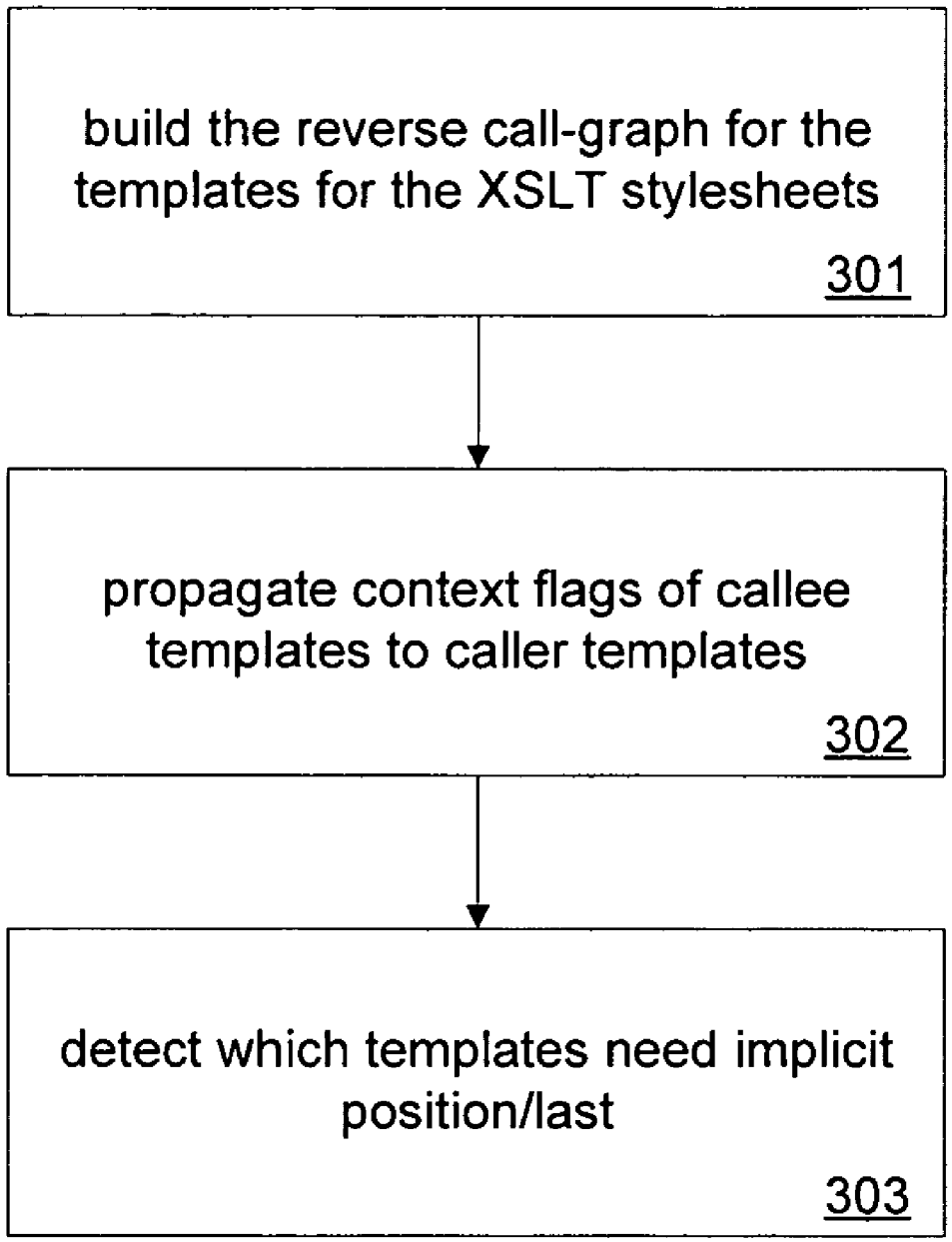
FIG. 3 illustrates an exemplary method for reverse call graph construction for templates in an XSLT program to be carried out in accordance with an exemplary embodiment of the invention.

Referring to FIG. 3, refer to our explanation for the inter-template focus inference on the sample templates "caller" and "callee". In one embodiment, this flow analysis is automated as follows, with the ultimate goal of detecting which templates really need implicit position/last according to step 303. Step 301 entails building the reverse call-graph for the templates for the XSLT stylesheets. A note on terminology: a "normal" call graph displays caller-callee dependencies; then the reverse one charts callee-caller dependencies.

In an exemplary algorithm, the reverse-call-graph represents the relation "can-be-called by" for two cases:
1. xsl:call-template in an xsl-template at the top level (not in the context of any xsl:for-each).
2. xsl:apply-imports (always at the top level per XSLT syntax rules).

These cases can be important because context flags of callee templates should be propagated to caller templates, according to step 302. The remaining cases of xsl:call-template do not take part in propagation of focus flags, because they are executed in the context of xsl:for-each. We note that xsl:apply-templates does not contribute to the propagation of focus flags because it calls templates in the context of its own implicit for-each.

Phase 3—Inter-Template Focus Propagation

According to step 103 in FIG. 1, one embodiment may conduct a focus propagation to do the flow analysis over the call graph step 103. One implementation of such a step 103 is illustrated in FIG. 4.

Figure 4:
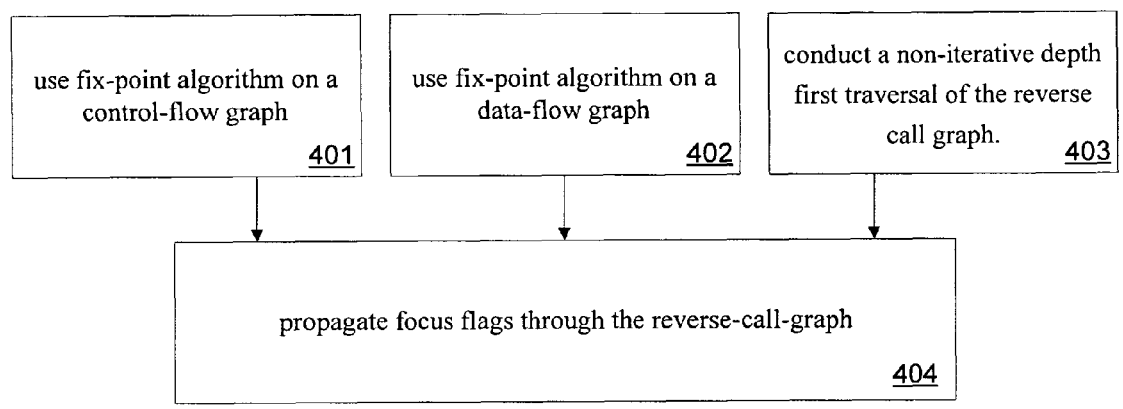
FIG. 4 illustrates an exemplary method for focus propagation to do flow analysis over a call graph in accordance with an exemplary embodiment of the invention.

Referring to FIG. 4, in one embodiment, given focus flags on abstract representation per phase 1, and a reverse call graph per phase 2, we are now in the position to propagate focus flags through the reverse-call-graph, according to step 404. In the general case of flow analysis the result is potentially obtained by means of a fix-point algorithm on a control-flow 401 or data-flow graph 402 ("stop if no more changes have been done in the previous pass"). It turns out focus inference admits a more efficient approach: a one-pass (hence non-iterative) post-order ("depth-first") traversal of the call graph 403. This is an insight that contributes to the scalability of focus inference.

Focus Flags Propagation for Xsl:Apply-Import

An exemplary embodiment of our technique can handle imports as explained below. Consider the following XSLT stylesheets that are scattered over two files.

```
<!-- File name: imported.xsl -->
<xsl:stylesheet>
    <xsl:template name="T1" match="T1" mode="M">
        <xsl:value-of select="position( )"/>
    </xsl:template>
    <xsl:template name="T2" match="T2" mode="M">
        <xsl:value-of select="last( )"/>
    </xsl:template>
</xsl:stylesheet>
<!-- File name: main.xsl -->
<xsl:stylesheet>
    <xsl:import href="imported.xsl"/>
    <xsl:template name="Tmain" match="*" mode="M">
        <xsl:apply-imports/>
    </xsl:template>
</xsl:stylesheet>
```

In this case, the xsl:apply-imports instruction may call ether the "T1" template or the "T2" template, and therefore the focus flags of the "Tmain" template depend on the focus flags of both "T1" and "T2". This means that logically we should add as many edges to the reverse call graph as there are templates that were imported by "main.xsl" and that carry the relevant mode "M". In practice, we instead add edges to a special node that collectively represents all templates in a given mode imported into a given stylesheet. This also improves scalability of the inference. As an aside, this discussion also demonstrates that focus inference naturally interacts with the XSLT concept of modes.

Overview of Exemplary Implementation

This section presents an overview of an exemplary implementation. The logic, as described above, can be implemented in a system such as the NET Framework 2.0. Such an implementation uses, for example, C #2.0.

The exemplary implementation is located in the XslAstAnalyzer class, which is one of the internal classes of the XslCompiledTransform implementation. This class implements a visitor on the XSLT AST—the in-memory tree that represents stylesheets. We use the standard visitor pattern here. We refer to Listing 1 for the visitor methods which clearly resemble the AST node types for an XSLT program.

Here is a sketch of the XslAstAnalyzer class:

```
namespace System.Xml.Xsl.Xslt {
    internal class XslAstAnalyzer : XslVisitor<XslFlags> {
        // ... implementation elided ...
    }
}
```

The visitor traverses the AST in bottom-up manner while calculating the flags for tree node according to phase 1 and adding edges to the reverse call graph according to phase 2. Hence, phase 1 and phase 2 are carried out in an interleaved manner. (In reality, the visit methods also build data structures for other program analyses as mentioned earlier.) For instance, the following visit method deals with AST nodes that represent those template calls that contribute to focus propagation:

```
protected override XslFlags VisitCallTemplate(XslNode node) {
    if (currentTemplate != null) {
        if (this.forEachDepth == 0) {
            // Naked xsl:call-template, target would take its focus from currentTemplate
            revCall0Graph.AddEdge(target, currentTemplate);
        }
        // ... other inferences elided for clarity ...
    }
}
```

That is, the visit method creates an edge in the reverse-call-graph. We refer to Listing 2 for a sketch of the graph class that is instantiated for reverse call graphs. Upon completion of the visitor's work, the XslAstAnalyzer class calls the Propagate-Flag( ) method separately for each of the three focus flags. The propagation method is also shown in Listing 2.

As a result of this analysis, the entire AST is annotated with XslFlags and the "code generator" component of the XSLT compiler can use this information directly to avoid computation of unused focus and parameter passing for unused focus.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

Listing 1—The Visitor for XSLT Stylehseets

The shown methods correspond to the AST node types for XSLT programs.

```
protected override XslFlags Visit(XslNode node) { ... }
protected override XslFlags VisitChildren(XslNode node) { ... }
protected override XslFlags VisitAttributeSet(AttributeSet node) { ... }
protected override XslFlags VisitTemplate(Template node) { ... }
protected override XslFlags VisitApplyImports(XslNode node) { ... }
protected override XslFlags VisitApplyTemplates(XslNode node) { ... }
protected override XslFlags VisitAttribute(NodeCtor node) { ... }
protected override XslFlags VisitCallTemplate(XslNode node) { ... }
protected override XslFlags VisitComment(XslNode node) { ... }
protected override XslFlags VisitCopy(XslNode node) { ... }
protected override XslFlags VisitCopyOf(XslNode node) { ... }
protected override XslFlags VisitElement(NodeCtor node) { ... }
protected override XslFlags VisitError(XslNode node) { ... }
protected override XslFlags VisitForEach(XslNode node) { ... }
protected override XslFlags VisitIf(XslNode node) { ... }
protected override XslFlags VisitLiteralAttribute(XslNode node) { ... }
protected override XslFlags VisitLiteralElement(XslNode node) { ... }
protected override XslFlags VisitMessage(XslNode node) { ... }
protected override XslFlags VisitNumber(Number node) { ... }
protected override XslFlags VisitPI(XslNode node) { ... }
protected override XslFlags VisitSort(Sort node) { ... }
protected override XslFlags VisitText(Text node) { ... }
protected override XslFlags VisitUseAttributeSet(XslNode node) { ... }
protected override XslFlags VisitValueOf(XslNode node) { ... }
protected override XslFlags VisitValueOfDoe(XslNode node) { ... }
protected override XslFlags VisitParam(VarPar node) { ... }
protected override XslFlags VisitVariable(Varpar node) { ... }
protected override XslFlags VisitWithParam(VarPar node) { ... }
```

Listing 2—General Graph Using Hashtable of Adjacency Lists

This class is used to represent (reverse) call graphs.
There is a general facility for flag annotation.
There is also readily support for propagation of flags (using DepthFirstSearch; elided).

```
internal class Graph<V> : Dictionary<V, List<V>>
    where V : XslNode
{
    private static IList<V> empty;
    public IEnumerable<V> GetAdjList(V v) { ... }
    public void AddEdge(V v1, V v2) { ... }
    public void PropagateFlag(XslFlags flag) {
        // Clean Stop flags
        foreach (V v in Keys) {
            v.Flags &= ~XslFlags.Stop;
        }
        foreach (V v in Keys) {
            if ((v.Flags & XslFlags.Stop) == 0) {
                if ((v.Flags & flag) != 0) {
                    DepthFirstSearch(v, flag);
                }
            }
        }
    }
    private void DepthFirstSearch(V v, XslFlags flag) { ... }
}
```

The invention claimed is:

1. A method for performing focus inference when compiling an Extensible Markup Language Transforms (XSLT) stylesheet into a compiled XSLT processor, comprising:
    generating an Abstract Syntax Tree (AST) from said XSLT stylesheet;
    annotating nodes in said AST that are associated with variables and parameters with focus inference flags, said annotating comprising for each of said nodes determining which of a plurality of focus inference flags that define a focus is required to be maintained;
    building a reverse call graph for a template associated with the XSLT stylesheet;
    propagating any focus inference flags from a callee template to a caller template;
    propagating any focus inference flags through the reverse call graph; and
    using the focus defined by the focus inference flags directly in one or more of a code generator in an XSLT compilation architecture, an interpreter, and/or a JITer,
    wherein said focus inference flags comprise a "current" focus inference flag, a "position" focus inference flag, and a "last" focus inference flag.

2. The method of claim 1, wherein said reverse call graph represents a can-be-called by relation for an xsl:call-template in an xsl-template at a top level case.

3. The method of claim 1, wherein said reverse call graph represents a can-be-called by relation for an xsl:apply-imports case.

4. The method of claim 1, wherein said propagating any focus inference flags through the reverse call graph is conducted by a fixed-point algorithm on a control-flow graph.

5. The method of claim 1, wherein said propagating any focus inference flags through the reverse call graph is conducted by a non-iterative depth first traversal of the reverse call graph.

6. The method of claim 1, further comprising determining one or more parts of a focus that are required for an XPath expression at execution time.

7. A system for performing focus inference when compiling an Extensible Markup Language Transforms (XSLT) stylesheet into a compiled XSLT processor, comprising:
 a processor coupled to a memory, the memory having stored thereon instructions that when executed by the processor cause the processor to:
  generate an Abstract Syntax Tree (AST) from said XSLT stylesheet;
  annotate nodes in said AST that are associated with variables and parameters with focus inference flags, said annotating comprising for each of said nodes determining which of a plurality of focus inference flags that define a focus is required to be maintained;
  build a reverse call graph for a template associated with the XSLT stylesheet;
  propagate any focus inference flags from a callee template to a caller template;
  propagate any focus inference flags through the reverse call graph; and use the focus defined by the focus inference flags directly in one or more of a code generator in an XSLT compilation architecture, an interpreter, and/or a JITer,
 wherein said focus inference flags comprise a "current" focus inference flag, a "position" focus inference flag, and a "last" focus inference flag.

8. The system of claim 7, wherein said reverse call graph represents a can-be-called by relation for an xsl:call-template in an xsl-template at a top level case.

9. The system of claim 7, wherein said reverse call graph represents a can-be-called by relation for an xsl:apply-imports case.

10. The system of claim 7, wherein propagating any focus inference flags through the reverse call graph further comprises using a fixed-point algorithm on a control-flow graph.

11. The system of claim 7, wherein propagating any focus inference flags through the reverse call graph further comprises using a fixed-point algorithm on a data-flow graph.

12. The system of claim 7, wherein propagating any focus inference flags through the reverse call graph further comprises conducting a non-iterative depth first traversal of the reverse call graph.

13. A computer readable storage medium bearing instructions for performing focus inference when compiling an Extensible Markup Language Transforms (XSLT) stylesheet into a compiled XSLT processor, said instructions comprising:
 instructions for generating an Abstract Syntax Tree (AST) from said XSLT stylesheet;
 instructions for annotating nodes in said AST that are associated with variables and parameters with focus inference flags, said annotating comprising for each of said nodes determining which of a plurality of focus inference flags that define a focus is required to be maintained;
 instructions for building a reverse call graph for a template associated with the XSLT stylesheet;
 instructions for propagating any focus inference flags from a callee template to a caller template;
 instructions for propagating any focus inference flags through the reverse call graph; and
 instructions for using the focus defined by the focus inference flags directly in one or more of a code generator in an XSLT compilation architecture, an interpreter, and/or a JITer,
 wherein said focus inference flags comprise a "current" focus inference flag, a "position" focus inference flag, and a "last" focus inference flag.

14. The computer readable storage medium of claim 13, wherein said reverse call graph represents a can-be-called by relation for an xsl:call-template in an xsl-template at a top level case.

15. The computer readable storage medium of claim 13, wherein said reverse call graph represents a can-be-called by relation for xsl:apply-imports case.

16. The computer readable storage medium of claim 13, wherein said instructions for propagating any focus inference flags through the reverse call graph use a fixed-point algorithm on a control flow graph or a data-flow graph.

17. The computer readable storage medium of claim 13, wherein said instructions for propagating any focus inference flags through the reverse call graph use a non-iterative depth first traversal of the reverse call graph.

* * * * *